United States Patent [19]

Sharp et al.

[11] Patent Number: 4,613,146
[45] Date of Patent: Sep. 23, 1986

[54] MONOCOQUE BICYCLE FRAME

[76] Inventors: Timothy M. Sharp, 7139 Linden Ter., Carlsbad, Calif. 92008; Donald C. Stephan, 4585 Pembroke, Reno, Nev. 89502

[21] Appl. No.: 606,649

[22] Filed: May 3, 1984

[51] Int. Cl.⁴ .............................................. B62K 3/14
[52] U.S. Cl. ................................................ 280/281 B
[58] Field of Search ............... 280/281 B, 281 R, 274; 180/219

[56] References Cited

U.S. PATENT DOCUMENTS

| | | | |
|---|---|---|---|
| 2,729,466 | 1/1956 | Giordani | 280/281 R |
| 3,233,916 | 2/1966 | Bowden | 280/281 R |
| 4,230,332 | 10/1980 | Porsche | 280/281 B |
| 4,368,897 | 1/1983 | Brown | 280/281 B |
| 4,411,333 | 10/1983 | Bothwell | 180/219 |

FOREIGN PATENT DOCUMENTS

| | | | |
|---|---|---|---|
| 2453135 | 5/1975 | Fed. Rep. of Germany | 280/281 R |
| 2455141 | 7/1975 | Fed. Rep. of Germany | 280/281 R |
| 591926 | 9/1947 | United Kingdom | 280/281 R |

*Primary Examiner*—John J. Love
*Assistant Examiner*—Everett G. Diederiks, Jr.
*Attorney, Agent, or Firm*—Albert L. Gabriel

[57] ABSTRACT

A monocoque bicycle frame having a body defined by right and left side panels, top and bottom panels, and a bifurcated rearward portion defined by such panels and also by a rear wheel well insert. The body panels and insert completely enclose a continuous internal space which is compression loaded or tensile prestressed with a rigid foam plastic for increased torsional rigidity and resistance to impact distortion. The pedal sprocket and chain are both external of the hollow frame so as to not interrupt the continuity of the body cavity and its compression loading, and also enabling the body to have minimal weight and an optimum aerodynamic configuration. The frame is diamond-shaped in side profile enabling the monocoque to be constructed as a pair of triangles connected back-to-back for optimum strength, both torsionally and against vertical loading.

10 Claims, 7 Drawing Figures

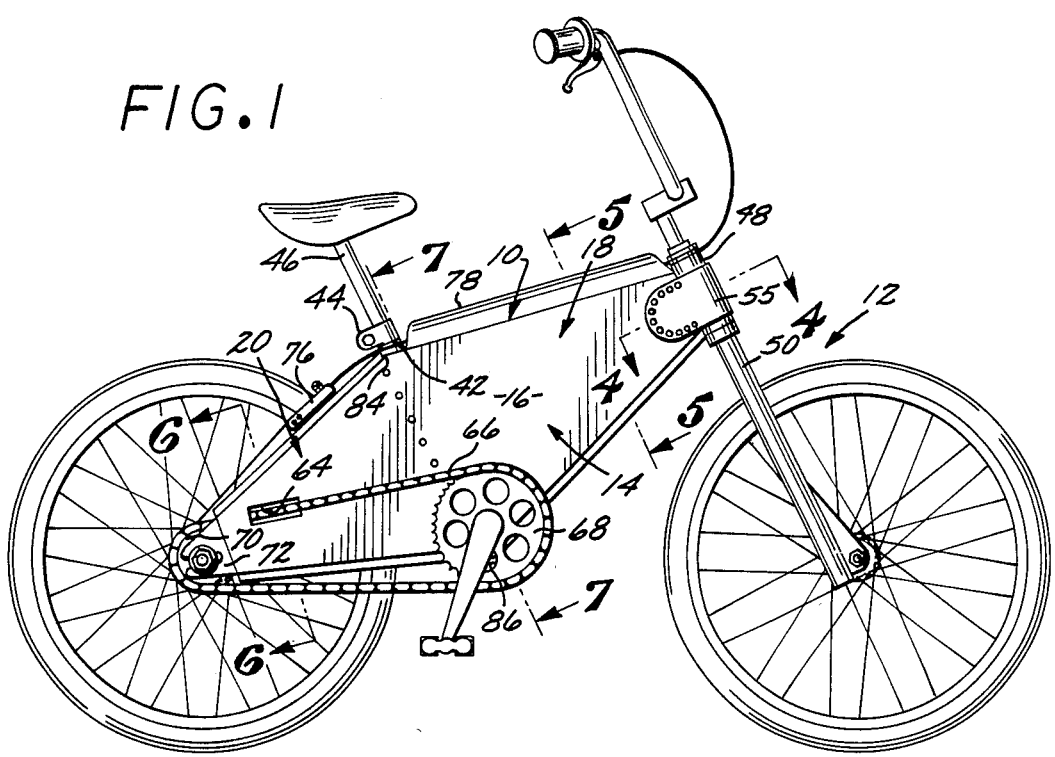

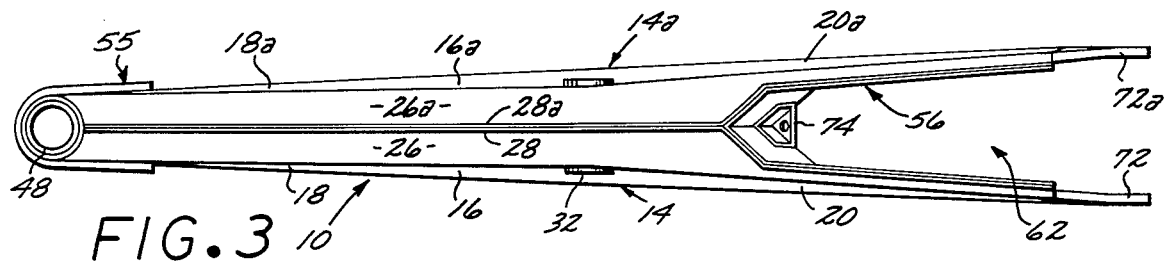
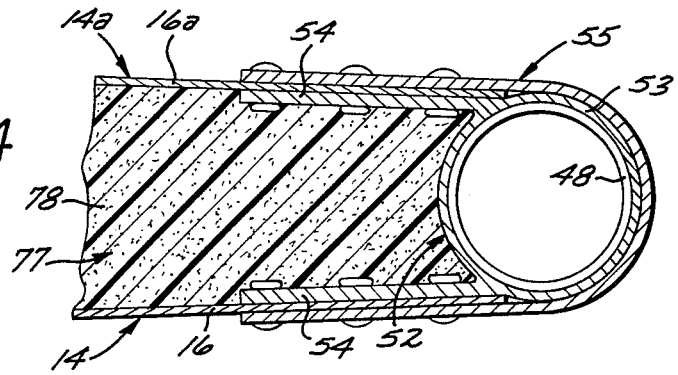
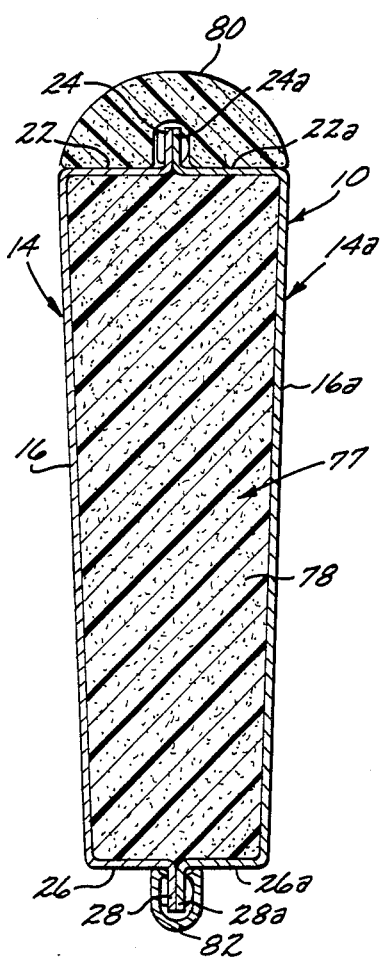
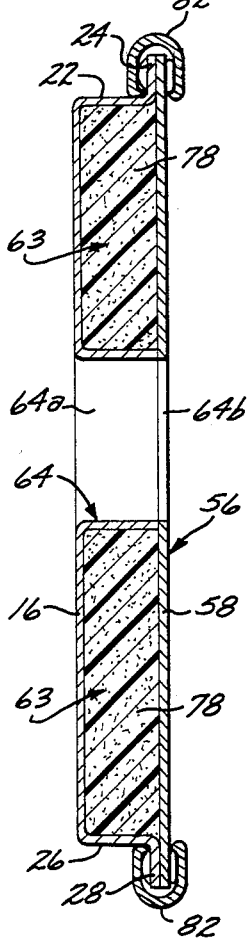

MONOCOQUE BICYCLE FRAME

BACKGROUND OF THE INVENTION

1. Field of the Invention

The present invention is in the field of bicycle frames, and it relates particularly to a monocoque-type bicycle frame.

2. Description of the Prior Art

The conventional bicycle frame has for many years been, and still is, what is commonly referred to as the "tube frame," which is an assembly of pipes that are welded together. The tube-type bicycle frame has several inherent disadvantages which have resulted in numerous attempts to find some other solution to a satisfactory bicycle frame. One disadvantage of the tube frame is its excessive cost to manufacture because of the numerous manufacturing steps required. Thus, all of the tubes of the frame must first be welded together, then they must be sanded, with particular attention directed to the regions of the welds; then the assembled frame must be finished, dipped for corrosion protection; sprayed with primer, and then sprayed with paint, with suitable drying time in between the dipping and spraying steps.

Another disadvantage of the tube-type bicycle frame is the substantial weight penalty that must be paid in order to achieve torsional rigidity. This is not a serious problem in ordinary street bicycles where weight is not a big factor. However, in competition bicycles such as racing bicycles, and particularly in BMX (bicycle motocross) racing bikes, strength-to-weight is a critical factor, and in this regard the most important strength factor is torsional rigidity. The weight of a bicycle frame may be reduced to only approximately 2.5 pounds for serious racing, and this can only be achieved in a tube frame with considerable sacrifice of torsional rigidity.

Another problem with the tube-type bicycle frame is that it presents an undesirably large amount of frontal area to the relative wind, and of course this is most important in racing bicycles where considerable speeds are achieved. Although the tube frame does not have the appearance of large frontal area, each tube that is not directed longitudinally toward the relative wind presents its own separate frontal area, and when these frontal areas are added up they result in a considerable amount of undesirable parasitic drag at high speeds.

A further problem with the tube-type bicycle frame is that in order to achieve the very light weights necessary for competition bicycles, exotic "space age" type metals must be employed, and these are both expensive and difficult to work.

Because of these problems with tube frames, there have been numerous attempts to replace the tube frame with a frame in the form of a hollow shell of formed or stamped sheet metal, molded fiberglass or the like. However, none of these attempts have proved completely satisfactory, and hence none of these hollow shell-type bicycle frames have come into widespread use. Although some of these attempts resulted in hollow shell bicycle frames that were simpler to manufacture than tube frames, the prior art hollow shell-type bicycle frames nevertheless had much the same problems as the tube frames, namely, they did not have an adequate strength-to-weight ratio, and in particular they did not have adequate torsional rigidity, even though they were in many instances considerably heavier than the conventional tube frame. Also, although considerable attention was given to aesthetics and curved shapes, the prior art hollow shell-type bicycle frames had undesirably large frontal areas and were generally aerodynamically unclean. Examples of prior U.S. patents disclosing hollow shell bicycle frames having these deficiencies are U.S. Pat. Nos. 2,182,828, to Stutsman et al., 2,537,325, to Bowden et al., 2,584,249, to Jaulmes, 3,233,916, to Bowden, 3,375,024, to Bowden and 4,230,332, to Porsche. Of these six prior U.S. patents, only the frame disclosed in the Porsche patent, 4,230,332, would appear to be reasonably light in weight, each wall of its hollow shell being made of an aluminum honeycomb (or balsa) core sandwiched between aluminum or fiberglass sheets. However, the configuration of this Porsche frame had opposed front and rear concavities which inherently gave the frame poor torsional rigidity relative to its weight and an aerodynamically unclean shape.

Metal stampings forming hollow shell frames for tricycles or other velocipedes are disclosed in Anderson U.S. Pat. No. 2,091,933 and Cockburn U.S. Pat. No. 4,389,055, but these frames have the same disadvantages noted above for prior art hollow shell bicycle frames. Hollow shells with the same disadvantages have been disclosed for motorscooters in U.S. Pat. Nos. 2,792,899, to Piatti and 2,908,501, to Lossau, in British Pat. No. 784,421 to Victoria-Werke. Similar hollow shell frames have been used for motorcycles, but in general these have the same disadvantages noted above for hollow shell bicycle frames, and additionally the strength requirements for motorcycles are, in general, so severe that such hollow shell frames when employed in motorcycles required additional structural reinforcement, such as use of the motor itself as a mechanical strength member, as disclosed in Asakura U.S. Pat. No. 4,334,589. Other hollow shell motorcycle frames which do not in any way solve the problems noted above in prior art bicycle hollow shell frames are U.S. Pat. Nos. 2,755,873, to Klaue, 4,171,731, to Hilber, 4,347,909, to Takemura et al. and 4,265,330 to Silk et al.

One of the things that made all of the prior art hollow shell bicycle frames undesirably bulky and heavy and of large frontal area and poor aerodynamic shape was that in each instance of which applicants are is aware the pedal sprocket or chain or other drive connection was enclosed within the hollow shell frame. This prevented a completely enclosed monocoque frame from being established, and it resulted in a frame which could not be completely filled with a rigid foam material so as to be compression loaded or prestressed to increase the overall torsional rigidity and resistance to side impacts. This defect is present in each of the to U.S. Pat. Nos. 2,182,828, to Stutsman et al., 2,537,325, to Bowden, 2,584,249, to Jaulmes, 3,233,916, to Bowden, 3,375,024, to Bowden and 4,230,332, to Porsche.

Applicant is not aware of any prior art compression loading or other form of prestressing of a hollow shell or monocoque-type bicycle frame for the purpose of increasing its strength-to-weight ratio, and in particular its torsional rigidity-to-weight ratio. U.S. Pat. No. 4,411,333 to Bothwell discloses a motorcycle fairing shell filled with a foam plastics material, but this material is a deformable or elastomeric foam adapted to deform under impact and thereby absorb some of the energy of an impact, which is a use of foam material generally opposite to that of compression loading or prestressing which requires a foam material that hardens into a rigid block.

SUMMARY OF THE INVENTION

In view of these and other problems in the art, it is a general object of the present invention to provide a bicycle frame of monocoque construction which has a greater strength-to-weight ratio than conventional tube frames or prior art attempts at hollow shell frames.

Another object of the invention is to provide a monocoque bicycle frame which, despite being light in weight, has high strength both in the important aspect of torsional rigidity and against the vertical loading that is applied by the weight of a rider.

Another object of the invention is to provide a monocoque bicycle frame which has minimal frontal area and is particularly aerodynamically clean so as to minimize parasitic drag.

A further object of the invention is to provide a monocoque bicycle frame which in part achieves its high structural strength both torsionally and against vertical loading by utilization of joined, back-to-back triangular segments which, for the first time, capture in a monocoque bicycle frame an optimum truss-like configuration.

A still further object of the invention is to provide compression loading or tensile prestressing of the panels or skins in a bicycle frame of monocoque construction.

Another object of the invention is to provide a bicycle frame of monocoque construction which is simpler and more economical to manufacture than the conventional tube bicycle frame, yet which nevertheless can be made with a better strength-to-weight ratio.

The present invention is a monocoque bicycle frame which may be employed in any type of bicycle, but which finds particular utility in BMX-type bicycles. When intended for racing bikes, the monocoque frame is preferably made of aircraft sheet aluminum, but if intended for street use it is preferably made of ABS which may be fiber reinforced. The frame has generally flat right and left side panels, a top panel, and a bottom panel, the frame being bifurcated at the rear to define a rear wheel well.

The bicycle frame of the present invention is, throughout its entire extent, of true monocoque construction, the side, top and bottom panels completely enclosing a continuous internal space which enables the entire monocoque frame to be compression loaded or prestressed with a rigid foam plastic, preferably foam polyurethane, for greatly increased torsional rigidity and also for strength of the large side panels against impact distortion. A dart-like shape looking from the bottom or top of the frame, flaring from its narrowest at a head tube rearwardly and outwardly to the rear end defined by a pair of rear wheel dropouts, is both aerodynamically clean and pleasing to the eye, while at the same time serving the important mechanical function of enabling the pedal sprocket and chain to be external of the frame and to not interrupt the continuous hollow interior of the frame, thus enabling the entire frame to be compression loaded with the foam plastic and to be of true monocoque construction.

The frame of the invention is diamond-shaped in side profile, which is an aerodynamically efficient shape and also enables the monocoque to be constructed as a pair of triangles connected back-to-back at a common base in the form of a perforated interior bulkhead, enabling an optimum truss-type arrangement to be employed for the first time in a monocoque bicycle frame. This construction optimizes both torsional strength and vertical support strength.

BRIEF DESCRIPTION OF THE DRAWINGS

These and other objects of the invention will become more apparent in view of the following description taken in conjunction with the drawings, wherein:

FIG. 1 is a side elevational view of a completely assembled BMX-type bicycle embodying the monocoque frame of the present invention;

FIG. 2 is an exploded perspective view of the frame of the present invention showing all of its parts except the rivets;

FIG. 3 is a bottom plan view of the frame of the invention;

FIG. 4 is an enlarged, fragmentary sectional view taken on the line 4—4 FIG. 1;

FIG. 5 is an enlarged sectional view taken on the line 5—5 in FIG. 1;

FIG. 6 is an enlarged sectional view taken on the line 6—6 in FIG. 1, showing only the right-hand section of the bifurcated rear portion of the frame; and FIG. 7 is an enlarged sectional view taken on the line 7—7 in FIG. 1.

DETAILED DESCRIPTION

The monocoque bicycle frame of the invention is generally designated 10 in the drawings, and is shown in FIG. 1 as the frame of a fully assembled bicycle 12 of the BMX (bicycle motocross) type. The monocoque bicycle frame of the present invention has particular utility in BMX-type bicycles, including BMX racing bikes, BMX street bikes, and cruisers, although it is to be understood that the present invention is suitable for use in any type of bicycle.

The body of the monocoque frame 10 of the invention is preferably made in two bilaterally symmetrical sections, a right-hand section 14 and a left-hand section 14a. If the frame 10 is to be employed on a competition bicycle where the maximum strength-to-weight ratio is desired, then the frame sections 14 and 14a are preferably stamped from half-hard aircraft aluminum that is preferably 0.028 to 0.032 inch in thickness. Where the frame 10 is to be employed on a street bicycle or cruiser, where weight is not a critical factor, then the frame sections 14 and 14a may be of molded plastic construction, preferably of the type generically known in the plastics art as SMC (sheet molded compound). Preferably plastic frame sections 14 and 14a are made of ABS (acrylic butyl styrene), which is a material that is used for luggage shells, or polycarbonate. The plastic frame sections 14 and 14a may be reinforced by any suitable fibers such as glass, Teflon, Kevlar (aramid), graphite or the like.

The right-hand monocoque frame section 14 includes a generally flat, diamond-shaped side panel or skin 16 having generally triangular forward and rearward sections 18 and 20, respectively. These generally triangular sections 18 and 20 are actually somewhat trapezoidal, being truncated at their free ends to provide for attachment of a head tube at the front end of the forward triangle section 18 and a rear wheel dropout at the rear end of the rearward triangle section 20, as described in detail hereinafter. Extending to the left or inwardly from the upper edge of the diamond-shaped right side panel 16, preferably at right angles thereto, is a top panel 22 which terminates in a vertically upwardly extending top flange 24. Similarly, extending to the left or inwardly from the lower edge of right side panel 16, preferably at right angles thereto, is a bottom panel 26 which terminates in a vertically downwwardly extending bottom flange 28.

The complementary left-hand monocoque frame section 14a includes a generally flat, diamond-shaped side panel or skin 16a having generally triangular (technically trapezoidal) forward and rearward sections 18a and 20a, respectively. Left-hand top panel 22a extends to the right or inwardly from the upper edge of the diamond-shaped left side panel 16a, preferably at right angles thereto, the top panel 22a terminating in a vertically upwardly extending top flange 24a. Similarly, left-hand bottom panel or skin 26a extends to the right or inwardly from the lower edge of left side panel 16a, preferably at right angles thereto, and terminates in a vertically downwardly extending bottom flange 28a.

From the front ends of the frame sections 14 and 14a rearwardly to points 29 and 29a a short distance to the rear of the center or deepest part of the diamond shape, the top flanges 24 and 24a are connected together to form an upper center seam of the frame 10 and the bottom flanges 28 and 28a are connected together to form a lower center seam of the frame 10. Such connections may be by means of rivets as illustrated, or alternatively by means of a bonding agent such as aircraft epoxy. Preferably, to obtain maximum structural strength and torsional rigidity, a double connection is employed, both by means of rivets and by means of a bonding agent such as aircraft epoxy.

To the rear of the points 29 and 29a, the right-hand flanges 24 and 28 are stepped laterally outwardly to the right closer to the respective right-side panel or skin 16 and the left-hand flanges 24a and 28a are stepped laterally outwardly to the left closer to the left side panel or skin 16a so as to provide for a wheel well as described in detail hereinafter.

A bottom bracket generally designated 30 extends transversely through the frame 10 near the bottom of the frame proximate the deepest part of the diamond. The bottom bracket 30 includes a tubular core 32 within which the pedal shaft bearings are supported, and a pair of generally arc-shaped right and left-hand mounting flanges 34 and 34a, respectively, that extend radially from the tubular core 32. Holes 36 and 36a are provided through the respective right and left side panels 16 and 16a through which exposed ends of the tubular core 32 extend, as seen in FIGS. 2 and 7. Inwardly-formed, vertical, arcuate areas 38 and 38a of respective side panels 16 and 16a are provided around the respective holes 36 and 36a, these areas 38 and 38a registering with flat outwardly-directed surfaces of the respective flanges 34 and 34a for connection of the skins 16 and 16a to the respective flanges 34 and 34a by riveting, by means of a bonding agent such as aircraft epoxy, or by both types of bonding.

A transverse bulkhead 40 extends upwardly from the bottom bracket flanges 34 and 34a to just beneath the top panels or skins 22 and 22a proximate the center or deepest part of the diamond-shaped frame 10. The bulkhead 40 extends transversely through the entire width of the frame 10, having side flanges 41 and 41a to which the respective side panels 16 and 16a are connected by means of rivets, a bonding agent such as aircraft epoxy, or both. A seat post tube 42 extends upwardly from the bottom bracket core 32 along the front of bulkhead 40 and projects upwardly through half-round cutouts 43 and 43a in respective top panels 22 and 22a, having a clamp 44 on its exposed upper end adapted to be tightened about a seat post 46 that is telescopically engaged within the seat post tube 42. The bulkhead 40 has a series of regularly spaced, vertically elongated apertures 47 therein on each side of the seat post tube 42 primarily for the passage through bulkhead 40 of a foam plastic material that is injected into the inside of frame 10 as described below, but also to minimize weight of the frame 10.

A head tube 48 is mounted on the front end of frame 10 for receiving the shaft that projects upwardly from front wheel fork 50. The manner in which head tube 48 is mounted on frame 10 is best illustrated in FIG. 5. An inner bracket 52 has a tubular forward portion 53 that surrounds and grips the head tube 48 and a pair of rearwardly extending ears 54 which underlie the two side panels 16 and 16a. A U-shaped outer, overlap bracket 55 is engaged over the tubular portion 53 of inner bracket 52 and extends rearwardly in registry with the inner bracket ears 54 but overlying the panels 16 and 16a. The panels 16 and 16a are gripped between the inner bracket ears 54 and the outer bracket 55 preferably by means of rivets as shown, or by means of a bonding agent such as aircraft epoxy, or by both.

A rear insert 56, preferably made of the same sheet material as the frame sections 14 and 14a, is generally U-shaped in horizontal section. The rear insert 56 has flat side panels 58 and 58a which come together at a generally V-shaped front end 60 of insert 56. The right-hand side panel 58 of insert 56 is connected along its upper and lower edges to the respective top and bottom flanges 24 and 28, while the left-hand side panel 58a is connected along its upper and lower edges to the respective top and bottom flanges 24a and 28a. The rear insert 56 defines the rear wheel well 62 of the bicycle. As seen in FIG. 6, a cavity 63 is defined between the side panel 16 and the respective side 58 of rear insert 56. A similar cavity is defined between the side panel 16a and the respective side 58a of rear insert 56.

A chain hole generally designated 64 extends through the right-hand side panel 16 and the right side panel 58 of rear insert 56, being defined by registering holes 64a and 64b in respective panels 16 and 58. Preferably the wall of side panel 16 is turned inwardly, as best seen in FIG. 7, to close off the cavity 63 in the region of hole 64 so as to contain the foam plastic when it is injected into the frame 10, as described below; however, alternatively, this in-turned wall may be omitted and the resulting foam plastic routed out of the chain hole 64 after it has hardened. The chain hole 64 is longitudinally elongated so as to accommodate the upper length of bicycle chain 66 that extends rearwardly from pedal sprocket 68 to the rear wheel sprocket 70.

A right-hand rear wheel dropout 72 is connected between rear end portions of side panel 16 and insert panel 58, while a left-hand rear wheel dropout 72a is connected between rear end portions of side panel 16a and insert panel 58a, the dropouts 72 and 72a being connected by means of rivets, or by means of a bonding agent such as aircraft epoxy, or by both.

A generally triangular-shaped bracket 74 is mounted in the top forward end of rear insert 56, preferably being connected by rivets extending through the front of rear insert 56 and through the registering portions of top flanges 24 and 24a immediately to the rear of points 29 and 29a. The bracket 74 provides a mounting platform for a caliper-type rear wheel brake 76.

When completely assembled, the monocoque frame 10 of the present invention encloses a continuous hollow cavity consisting of a primary body cavity 77, seen in FIGS. 4, 5 and 7, that is located on both sides of the bulkhead 40 and communicates through the bulkhead apertures 47, and a pair of rearward cavities 63 defined between the rearward portions of the frame sections 14 and 14a and the rear insert 56. The front end of the primary body cavity 77 is closed off by the inner head tube bracket 52, while the rear ends of the rearward cavities 63 are closed off by the rear wheel dropouts 72 and 72a.

A liquid foaming material such as a urethane foam which will set into a rigid structural foam block is injected into the monocoque frame 10 after it has been completely assembled, so as to completely fill the primary body cavity 77 and the rearward cavities 63 on both sides of the wheel well 62. This foam material is preferably of the type that is currently used for the cores of surfboards, and the quantity of this liquid foaming material that is injected into the monocoque frame 10 is such that the foam material will expand to a compressed condition throughout the cavities 77 and 63 so as to prestress all of the panels or skins which make up the monocoque frame 10. Such compression loading or tensile prestressing of the panels considerably increases the overall torsional rigidity of the frame 10, and also provides resistance against deformation of either of the side panels or skins 16 and 16a in the event the bicycle should fall against some object or be otherwise impacted.

After the monocoque frame 10 has been completed, the top panels 22 and 22a of the forward triangle, which lies between the seat post tube 42 and the head tube 48, is preferably covered by an elastomeric foam pad or cushion 80 as seen in FIGS. 1 and 5, the pad 80 being adhesively bonded to the top panels 22 and 22a. Pad 80 is longitudinally slotted to cover the top flanges 24 and 24a of the forward triangle. Preferably the remainder of the top flanges 24 and 24a and all of the bottom flanges 28 and 28a are covered by a snap-on-type edge trim 82, as seen in FIGS. 5, 6 and 7.

The diamond configuration of the monocoque frame 10 of the invention, which is elongated generally in the direction of the longitudinal axis of the bicycle, together with the rigid foam compression prestressing, results in a frame that has a much greater strength-to-weight ratio than that of a conventional tube frame; and most importantly, the greatest feature of the strength of the monocoque frame 10 of the invention relative to the strength of a conventional tube frame is its high torsional rigidity. When made of aluminum, the monocoque bicycle frame 10 of the invention can be made at least as light as the lightest racing bike tube frame, on the order of only approximately 2.5 pounds, while at the same time, the monocoque frame of the invention will have 3 to 4 times the amount of torsional rigidity as the tube frame of comparable weight.

The overall elongated diamond shape of the monocoque frame 10 of the invention provides surprising strength against the vertical loading that is applied to the frame 10 by the weight of a rider. This is because the diamond shape divides the frame 10 into discrete forward and rearward triangles, each of which has its generally upright base defined by the bulkhead 40 and seat post tube 42. By this construction, the applicant has managed, for the first time in a monocoque bicycle frame, to capture the optimum truss configuration that is employed in bridges and the like, namely, one or more triangles. The monocoque frame 10 of the invention embodies a pair of such triangles that are connected back-to-back at a common base. Such structural arrangement provides the optimum structural strength in the generally downward direction of the applied weight of a rider, because such triangles are the only polygons whose shapes cannot alter without changing the lengths of their sides. With this double triangular monocoque configuration, the only stresses along the top and bottom legs of the triangles and also along the common base of the triangles are stresses of tension and compression. In the front triangle and the forward part of the rear triangle that is forward of the points 29 and 29a, the top panels 22 and 22a and the upper portions of the side panels 16 and 16a serve as a downwardly cupped channel beam of considerable column strength that is further strengthened by the connected top flanges 24 and 24a; while the bottom panels 26 and 26a and bottom portions of the side panels 16 and 16a form an upwardly cupped channel beam of considerable column strength that is reinforced by the additional strength of the connected bottom flanges 28 and 28a. Similarly, each half of the bifurcated portion of the rear triangle of frame 10 to the rear of points 29 and 29a includes a downwardly cupped channel beam along the top of the triangle formed by the top panel 22 or 22a and upper portions of the side panel 16 or 16a and the respective side panel 58 or 58a of insert 56, reinforced at the top by top flange 24 or 24a. In the same manner, each side of the bifurcated part of the rear triangle to the rear of points 29 and 29a includes an upwardly cupped channel beam along the bottom of the triangle formed by the bottom panel 26 or 26a and lower portions of the side panel 16 or 16a and the respective side panel 58 or 58a of insert 56, reinforced at the bottom by the respective bottom flange 28 or 28a. The overall diamond configuration of monocoque frame 10, by having its greatest vertical depth at the apices 84 and 86 of the diamond midway between the longitudinal ends of the diamond provides the greatest possible torsional strength at the location where it is most needed, namely proximate the longitudinal center of the frame; and as the depth decreases forwardly of the midpoint along the forward triangle and rearwardly from the midpoint along the rearward triangle, the need for torsional strength reduces generally proportionally. Accordingly, the overall diamond shape is generally optimum from the standpoint of torsional rigidity along the entire length of the frame 10, while at the same time providing an optimum configuration to accommodate vertical loading, as described above, with a minimum amount of structural material and hence weight.

present invention has the further important advantage that it enables a minimum frontal area of the frame to be achieved, and it is also a highly efficient aerodynamic shape in the front-to-rear direction, so that parasitic drag is minimal in the direction of the relative wind. In the preferred configuration shown in the drawings, as best seen in FIG. 3, the frame 10 has its minimum thickness between its sides 16 and 16a at its front end, which is only approximately the diameter of the head tube 48, the frame 10 flaring outwardly in a gentle taper from its front end to its rear end to the correct spacing between the rear wheel dropouts 72 and 72a for accommodating the rear wheel axle. This provides an overall dart-like shape as seen in FIG. 3 which is not only aerodynamically clean and pleasing to the eye, but serves an important function mechanically, which is to enable the pedal sprocket 68 and drive chain 66 to be located completely externally of the hollow interior of the monocoque frame 10, while nevertheless enabling the upper length of chain 66 to extend rearwardly from outside of the frame 10 through the chain hole 64 in the rearwardly and outwardly flaring right-hand portion of the frame into the wheel well and engagement with the rear wheel sprocket 70. By thus having the pedal sprocket 68 and chain 66 external of the hollow interior of frame 10, the frame 10 is enabled to be of minimum size and weight, of maximum aerodynamic efficiency, and very importantly, the frame 10 is enabled to ahve a continous hollow interior that can be compression loaded or prestressed with a block of rigid foam plastic material.

Also, in the preferred configuration illustrated, the monocoque frame 10 is narrowest between sides 16 and 16a along the bottom edge of the forward triangle, which is the principal leading edge of the frame 10 directed toward the relative wind, as can be seen in FIG. 1. This relative narrowness of the bottom edge of the forward triangle is best seen in FIGS. 3, 5 and 7. The monocoque frame 10 of the present invention is much more aerodynamically clean and efficient than the usual assembly of pipes employed in a tube frame, each pipe that is not longitudinally aligned with the relative wind having its own separate parasitic drag. The configuration of the monocoque frame 10 of the invention is also considerably more aerodynamically clean and efficient than any of the prior art attempts of which applicant is aware to construct a bicycle frame in whole or in part of sheet material.

The monocoque frame 10 of the present invention is much more economical to manufacture than the conventional tube frame-type bicycle which requires that all of the frame tubes first be welded together, that they then be sanded, finished, dipped, sprayed with primer, and then sprayed with paint, all of which is very expensive.

Although the presently preferred construction utilizes only the two formed or molded right and left-hand sections 14 and 14a, respectively, which are joined together at the center at top flanges 24 and 24a and bottom flanges 28 and 28a, a first aluminum-skinned prototype of the invention was satisfactory which employed separate, generally flat right and left side panels, a separate top panel with down-turned edges that were riveted to the upper edges of the side panels, and a separate bottom panel with upturned edges that were riveted to the bottom edges of the side panels; and in that prototype, top and bottom panels covering the bifurcated rear portion were similarly riveted to the side panels and to a rear insert like the insert 56 of the present invention.

While the present invention has been described herein in what is conceived to be the most practical and preferred embodiment, it is recognized that departures may be made therefrom within the scope of the invention, which is therefore not to be limited to the details disclosed herein, but is to be accorded the full scope of the claims.

I claim:
1. A monocoque bicycle frame which comprises:
panel means defining a hollow frame body having generally flat, spaced side walls, top and bottom walls, and front and rear ends,
a rearward portion of said body being bifurcated into a pair of spaced rear sections defining a rear wheel well therebetween;
a head tube mounted on said body proximate its said front end, and a rear wheel dropout mounted on each of said pair of rear sections proximate its rear end;
a bottom bracket extending generally transversely between said side walls and having sides exposed externally of said side walls;
said bottom bracket being rotatably constructed for supporting a pedal sprocket on one side thereof that is external of said body and pedals on both sides thereof;
means proximate said top wall for mounting a seat on said body; and
transverse bulkhead means extending across the hollow inside of said body and connected at its sides to the respective said side walls, said bulkhead means extending upwardly from proximate said bottom bracket to proximate said top wall, said seat mounting means being connected to said bulkhead means.

2. A monocoque bicycle frame as defined in claim 1, wherein said seat mounting means comprises seat post tube means attached to said bulkhead means.

3. A monocoque bicycle frame as defined in claim 2, wherein at least one of said bulkhead means and seat post tube means is connected to said bottom bracket.

4. A monocoque bicycle frame as defined in claim 1, wherein said body is generally diamond-shaped in side profile, said bulkhead means being located proximate the vertically deepest region of the diamond shape so that said body is in the general form of a pair of triangles connected back-to-back at a common base comprising said center blukhead means.

5. A monocoque bicycle frame which comprises:
panel means defining a hollow frame body having generally flat, spaced side walls, top and bottom walls, and front and rear ends,
a rearward portion of said body being bifurcated into a pair of spaced rear sections defining a rear wheel well therebetween;
a head tube mounted on said body proximate its said front end, and a rear wheel dropout mounted on each of said pair of rear sections proximate its rear end;
a bottom bracket extending generally transversely between said side walls and having sides exposed externally of said side walls;
said bottom bracket being rotatably constructed for supporting a pedal sprocket on one side thereof that is external of said body and pedals on both sides thereof;
means proximate said top wall for mounting a seat on said body;
said panel means comprising right and left halves jointed together at a center seam forward of said wheel well; and
a rear insert connected to both of said halves and defining said wheel well.

6. A monocoque bicycle frame as defined in claim 5, wherein each of said halves comprises an upper flange extending upwardly from its top wall and a lower flange extending downwardly from its bottom wall, said upper flanges being connected together and said lower flanges being connected together at said center seam, and said upper and lower flanges being connected to said rear insert rearwardly of said center seam.

7. A monocoque bicycle frame as defined in claim 6, wherein said flange connections comprise riveted connections.

8. A monocoque bicycle frame as defined in claim 6, wherein said flange connections comprise adhesively bonded connections.

9. A monocoque bicycle frame as defined in claim 6, wherein said flange connections are both riveted and adhesively bonded.

10. A monocoque bicycle frame as defined in claim 5, wherein each of said rear wheel dropouts is clamped between a rearward portion of a respective said side wall and a rearward portion of said rear insert.

* * * * *